United States Patent
Tsao et al.

(10) Patent No.: US 11,987,134 B2
(45) Date of Patent: May 21, 2024

(54) SPEED-COMMAND GENERATING UNIT OF ELECTRIC VEHICLE, AND SPEED-COMMAND GENERATING METHOD USED FOR THE SAME

(71) Applicant: Delta Electronics, Inc., Taoyuan (TW)

(72) Inventors: Chun-Chia Tsao, Taoyuan (TW); Chien-Ping Huang, Taoyuan (TW)

(73) Assignee: Delta Electronics, Inc., Taoyuan (TW)

( * ) Notice: Subject to any disclaimer, the term of this patent is extended or adjusted under 35 U.S.C. 154(b) by 467 days.

(21) Appl. No.: 17/387,813

(22) Filed: Jul. 28, 2021

(65) Prior Publication Data

US 2022/0281326 A1    Sep. 8, 2022

(30) Foreign Application Priority Data

Mar. 5, 2021    (CN) .......................... 202110246735.2

(51) Int. Cl.
*B60L 15/20* (2006.01)
*B60T 1/02* (2006.01)

(52) U.S. Cl.
CPC ....... *B60L 15/2009* (2013.01); *B60L 2240/12* (2013.01); *B60L 2240/421* (2013.01); *B60L 2240/423* (2013.01); *B60L 2250/28* (2013.01); *B60T 1/02* (2013.01)

(58) Field of Classification Search
None
See application file for complete search history.

(56) References Cited

U.S. PATENT DOCUMENTS

| 2010/0057284 A1 | 3/2010 | Tang et al. |
| 2014/0297078 A1 | 10/2014 | Yonezaki et al. |
| 2016/0221468 A1* | 8/2016 | Suzuki ................ B60L 15/2009 |

(Continued)

FOREIGN PATENT DOCUMENTS

| CN | 101209683 A | 7/2008 |
| CN | 104071032 A | 10/2014 |

(Continued)

OTHER PUBLICATIONS

Office Action dated Feb. 25, 2022 of the corresponding Taiwan patent application No. 110107883.

*Primary Examiner* — Amelia Vorce
(74) *Attorney, Agent, or Firm* — Chung-Ming Shih; HDLS IPR SERVICES

(57) ABSTRACT

A speed-command generating unit incorporated with an electric vehicle having a throttle module, a mechanical brake and a motor is disclosed and includes: a computation module for generating a computation value of a speed-command according to a throttle operating signal from the throttle module, a sensing module for detecting an activated status of the mechanical brake, a selecting module for providing a braking approach selecting signal, a trimming module for setting a trimming flag according to the activated status of the mechanical brake of last cycle, and a switching module connected therewith. The switching module generates different output values of the speed-command for the motor according to different foundations depending on the content of the trimming flag when the mechanical brake is inactivated in this cycle, and generates the output value according to the content of the braking approach selecting signal when the mechanical brake is activated in this cycle.

10 Claims, 9 Drawing Sheets

(56) References Cited

U.S. PATENT DOCUMENTS

2017/0240145 A1* 8/2017 Ohta .................... B60T 1/10
2018/0319397 A1* 11/2018 Ohta .................... B60W 10/04
2020/0377118 A1* 12/2020 Ando ................... B60W 50/029
2021/0197672 A1* 7/2021 King .................... B60L 7/14

FOREIGN PATENT DOCUMENTS

| TW | 202000498 A | 1/2020 | |
|----|----|----|----|
| WO | WO-2018221269 A1 * | 12/2018 | ........... B60K 17/356 |
| WO | 2021019780 A1 | 2/2021 | |

* cited by examiner

SPEED-COMMAND GENERATING UNIT OF ELECTRIC VEHICLE, AND SPEED-COMMAND GENERATING METHOD USED FOR THE SAME

BACKGROUND OF THE DISCLOSURE

Technical Field

The present disclosure relates to an electric vehicle, and specifically relates to a speed-command generating unit and speed-command generating method of an electric vehicle.

Description of Related Art

The electric vehicles in the market may use a torque-control architecture or a speed-control architecture. Generally, the demand of users for a daily used vehicle (such as an electric motorcycle) is simple, so this kind of electric vehicles usually use the torque-control architecture. In comparison, an industrial vehicle (such as a stacker) requires a more stable speed, and also needs a self-braking force generated when a driver of the electric vehicle releases a throttle of the electric vehicle, so this kind of electric vehicles usually use the speed-control architecture.

Generally, an industrial vehicle needs basic requirements for operability and comfortability, however, the transmission system and the suspension system of the industrial vehicle are relatively simple in comparison with the daily used vehicle due to the cost consideration. As a result, how to compensate the structure deficiencies of the industrial vehicle by improving the controlling technology in order to satisfy the vehicle driver's operability and comfortability, becomes a matter to each of the vehicle manufacturers.

FIG. 1 is a schematic diagram showing a speed-command generating unit of related art. In the speed-control architecture of related art as shown in FIG. 1, a speed-command input value 11 and a last computation value 12 are continuously inputted to a speed-command unit 10 for the speed-command unit 10 to compute and output a speed-command output value 13 correspondingly. The speed-control architecture is operated periodically, and the speed-command output value 13 is used as the last computation value 12 (i.e., a computation value of last cycle) and inputted to the speed-command unit 10.

However, the speed-command unit 10 of related art only has a basic acceleration/deceleration function and a basic S-curve function. Under such control architecture, the speed-command unit 10 cannot be aware when a mechanical brake of the electric vehicle is activated by a vehicle driver, so the speed-command unit 10 cannot immediately provide a braking torque corresponding. Besides, when the vehicle driver heavily presses the pedal of the electric vehicle to accelerate, makes the electric vehicle overloaded or rides the electric vehicle to climbing, it may cause a torque saturation and make the throttle signal (corresponding to the speed-command input value 11) to be invalid temporarily. When the above situation occurs, the vehicle driver will temporarily lose the ability in operating the electric vehicle, which is likely to cause an accident.

SUMMARY OF THE DISCLOSURE

The present disclosure is directed to a speed-command generating unit and a speed-command generating method of an electric vehicle, which may use an activated status of a mechanical brake and a braking approach of the electric vehicle as a foundation to switch or trim a speed-command.

In one of the exemplary embodiments, the speed-command generating unit is incorporated with a driver of an electric vehicle, the driver is used to drive a motor of the electric vehicle, and the speed-command generating unit includes:

a throttle module, configured to compute a set value of a speed-command in accordance with a throttle operating signal generated based on an external operation;

a computing module, configured to compute a computation value of the speed-command based on the set value;

a mechanical brake sensing module, configured to continuously detect an activated status of a mechanical brake of the electric vehicle;

a braking approach selecting module;

a trimming module, connected with the mechanical brake sensing module and the computing module, configured to set a trimming flag as disable if the mechanical brake is inactivated at a time of last sampling, and set the trimming flag as enable if the mechanical brake is activated at a time of last sampling; and a switching module, connected with the computing module, the mechanical brake sensing module, the braking approach selecting module and the trimming module, the switching module uses the computation value as a foundation to generate an output value of the speed-command to control the motor if the mechanical brake is detected to be inactivated by the mechanical brake sensing module at a time of this sampling and the trimming flag is disable, uses a motor rotating speed of the motor detected at the very time as a foundation to generate the output value of the speed-command to control the motor if the mechanical brake is detected to be inactivated by the mechanical brake sensing module at a time of this sampling and the trimming flag is enable, and switches a braking approach based on a braking approach selecting signal provided by the braking approach selecting module and uses the braking approach selecting signal as a foundation to generate the output value of the speed-command to control the motor if the mechanical brake is detected to be activated by the mechanical brake sensing module at a time of this sampling.

In one of the exemplary embodiments, the speed-command generating method is incorporated with a driver of an electric vehicle, the driver is used to drive a motor of the electric vehicle and includes a speed-command generating unit, the speed-command generating unit is used to compute a set value of a speed-command in accordance with a throttle signal and generate a computation value of the speed-command based on the set value, and the speed-command generating method includes:

a) continuously detecting an activated status of a mechanical brake of the electric vehicle;

b) setting a trimming flag in accordance with the activated status of last sampling, wherein the trimming flag is used to indicate that the mechanical brake is inactivated at a time of last sampling when being set as disable, and indicate that the mechanical brake is activated at a time of last sampling when being set as enable;

c) using the computation value of the speed-command at a time of this sampling as a foundation to generate an output value of the speed-command when the mechanical brake is determined to be inactivated at a time of this sampling in the step a) and the trimming flag is set as disable in the step b);

d) using a motor rotating speed of the motor as a foundation to generate the output value of the speed-command when the mechanical brake is determined to be inactivated at a time of this sampling in the step a) and the trimming flag is set as enable in the step b);

e) outputting the output value to the motor to drive the motor after the step c) or the step d); and f) when the mechanical brake is determined to be activated at a time of this sampling in the step a), switching a braking approach based on a braking approach selecting signal and using the braking approach selecting signal as a foundation to generate the output value of the speed-command to drive the motor.

In comparison with related art, the present disclosure uses the activated status of the mechanical brake and the braking approach of the electric vehicle to switch or trim the output value of the speed-command of the electric vehicle, therefore, the problem that the vehicle driver may lose the ability in controlling the electric vehicle when the mechanical brake is activated because the system is not aware immediately of the vehicle driver's operation, may be effectively resolved.

DETAILED DESCRIPTION OF THE DISCLOSURE

In cooperation with the attached drawings, the technical contents and detailed description of the present disclosure are described hereinafter according to multiple embodiments, being not used to limit its executing scope. Any equivalent variation and modification made according to appended claims is all covered by the claims claimed by the present disclosure.

The present disclosure discloses a speed-command generating unit of an electric vehicle, the speed-command generating unit may be incorporated with a driver of an arbitrary electric vehicle such as a stacker, an electric motorcycle, an electric car, etc. In particular, the speed-command generating unit of the present disclosure may be implemented by software or firmware. A driver with the speed-command generating unit may switch or trim a speed-command of an electric vehicle, through logical determination as discussed in the following, when a vehicle driver activates a mechanical brake of the electric vehicle, heavily presses the pedal of the electric vehicle to accelerate, makes the electric vehicle overloaded, or rides the electric vehicle to climbing. As a result, the problem of related art that the vehicle driver may temporarily lose the ability in controlling the electric vehicle when performing the above operations may be resolved.

Figure 1:
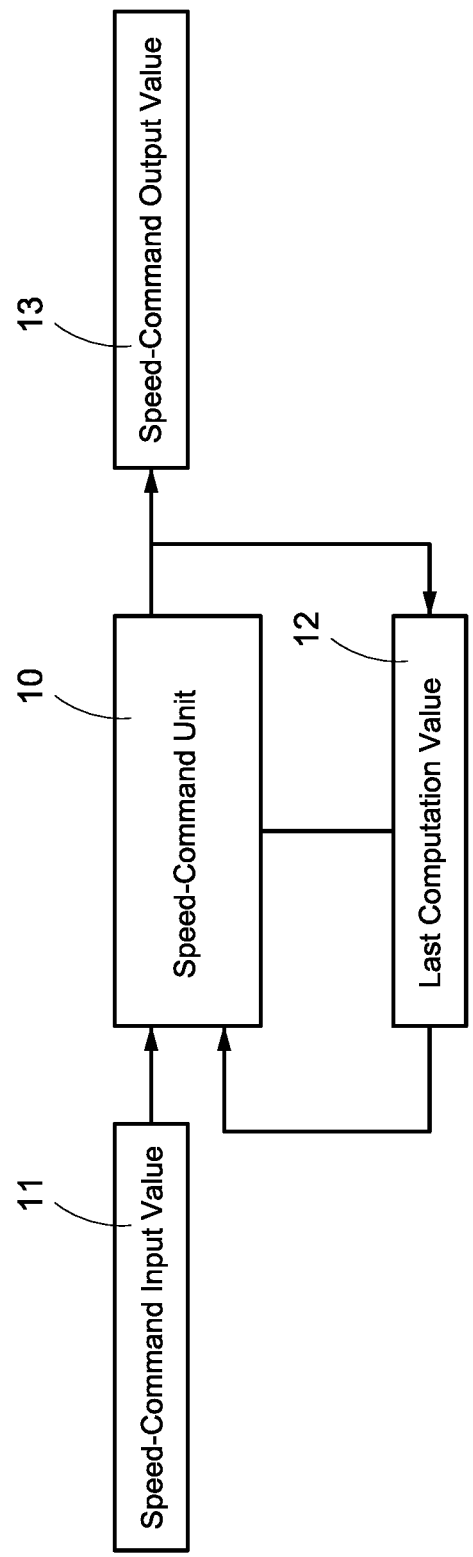
FIG. 1 is a schematic diagram showing a speed-command generating unit of related art.
Figure 2:
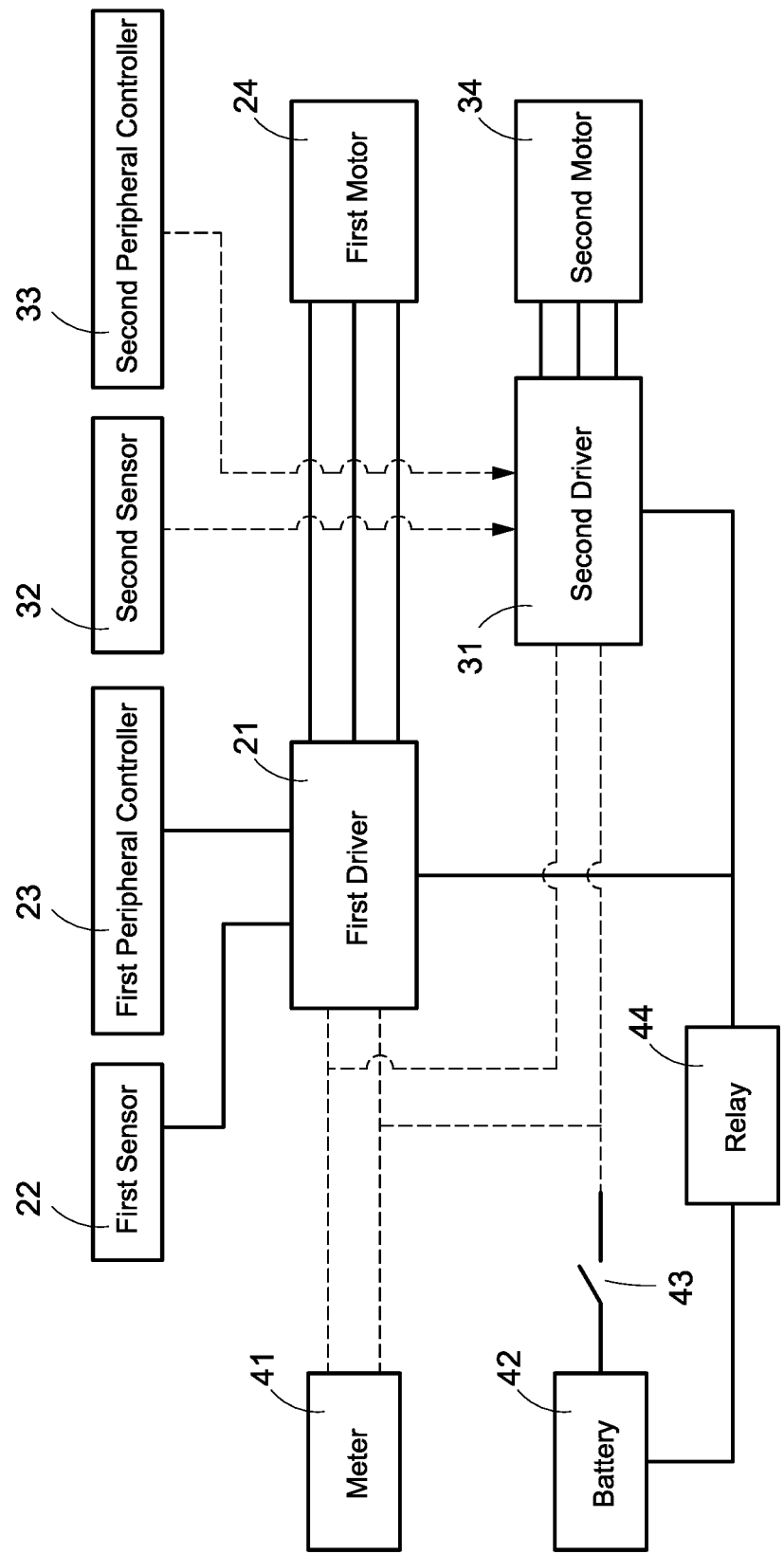
FIG. 2 is a schematic diagram showing an electric vehicle using multi-motor system of the present disclosure.

FIG. 2 is a schematic diagram showing an electric vehicle using multi-motor system of the present disclosure. Generally, an electric vehicle may use a single motor system which controls one motor with one driver, and may use a multi-motor system which controls multiple motors with at least one driver. FIG. 2 illustrates an electric vehicle using a multi-motor system that controls multiple motors with multiple drivers, but not limited thereto.

As shown in FIG. 2, an electric vehicle may include a first driver 21, a first sensor 2 used to sense and provide a specific data to the first driver 21, a first peripheral controller 23 used to control the first driver 21 according to a specific information, and a first motor 24 being driven to rotate according to a speed-command or a torque-command received from the first driver 21. In the multi-motor system, the electric vehicle may further include a second driver 31 independent to the first driver 21, a second sensor 32 used to sense and provide a specific data to the second driver 31, a second peripheral controller 33 used to control the second driver 31 according to a specific information, and a second motor 34 being driven to rotate according to a speed-command or a torque-command received from the second driver 31.

The first motor 24 is controlled to rotate by the first driver 21, the second motor 34 is controlled to rotate by the second driver 31, the rotation of the first motor 24 and the second motor 34 are theoretically independent without interference with each other. In one embodiment of the present disclosure, the speed-command generating unit may be arranged in the first driver 21 or the second driver 31 in a manner of software or firmware. In another embodiment of the present disclosure, the speed-command generating unit may be arranged in both of the first driver 21 and the second driver 31, and each of the two speed-command generating units may operate independently.

As shown in FIG. 2, the electric vehicle may include a meter 41, the meter 41 is connected with the first driver 21 and the second driver 31 to receive motor information and then display the received information for a vehicle driver to read. In one embodiment, the vehicle driver here indicates the person who rides and controls the electric vehicle. Also, the electric vehicle includes a battery 42, the battery 42 provides power to the system, and the battery 42 is connected with the first driver 21 and the second driver 31 through a switch 43. When the switch 43 is on (for example, the vehicle driver turns on the electric vehicle by a key), the first driver 21 and the second driver 31 may be activated through the power received from the battery 42. Therefore, the first driver 21 and the second driver 31 may generate a speed-command or a torque-command used to control the first motor 24 and/or the second motor 34 in according to the speed-command generating unit of the present disclosure and a throttle signal generated from an operation made by the vehicle driver to a throttle unit of the electric vehicle (not shown). Besides, the battery 42 may be connected with the first driver 21 and the second driver 31 through a relay 44, and the relay 44 may adjust or converse the power provided from the battery 42.

Figure 3:
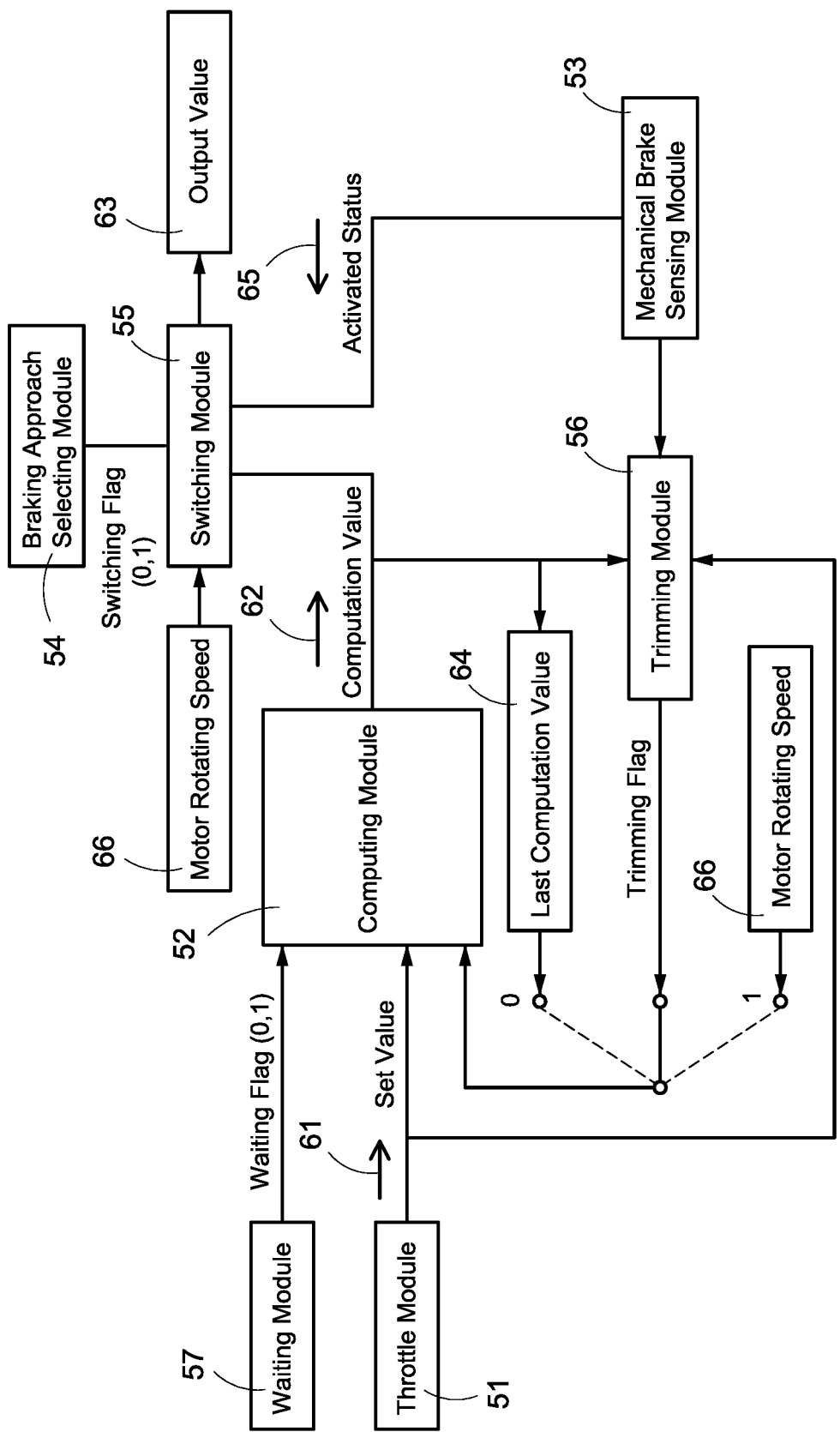
FIG. 3 is a block diagram showing a speed-command generating unit of a first embodiment according to the present disclosure.

FIG. 3 is a block diagram showing a speed-command generating unit of a first embodiment according to the present disclosure. As shown in FIG. 3, the speed-command generating unit of the present disclosure may be divided into multiple function modules based on the functions to be executed. The multiple function modules may operate independently or jointly, and at least include a throttle module 51, a computing module 52, a mechanical brake sensing module 53, a braking approach selecting module 54, a switching module 55 and a trimming module 56. It is worth saying that the above modules may be software modules implemented by computer-readable code executed by a processor (such as the driver), and may be physical modules such as electrical circuits connected with physical elements in the electric vehicle, but not limited thereto.

The throttle module 51 is connected with a physical throttle unit (not shown) of the electric vehicle, so the throttle module 51 may generate a throttle operating signal correspondingly based on an operation made by the vehicle driver to the throttle unit, such as pressing a throttle pedal or rotating a throttle handle. In one embodiment, the speed-command generating unit generates an output value 63 of a speed-command directly in accordance with the operation made by the vehicle driver to the throttle unit. In this scenario, the speed-command is unnecessary to be switched or trimmed. Therefore, the throttle module 51 may use the throttle operating signal as a set value 61 of the speed-command directly.

The computing module 52 is connected with the throttle module 51 to receive the set value 61 from the throttle module 51, and provides a computation value 62 of the speed-command based on the set value 61. In one embodiment, the computing module 52 is similar to a speed controller used in related art (i.e., a controller that is capable of a basic acceleration/deceleration function and a basic S-curve function), detailed description is omitted here for brevity.

During a periodical testing procedure, or under a situation that the speed-command is unnecessary to be switched or trimmed, the computing module 52 uses the computation value 62 as a last computation value 64 (i.e., a computation value of last cycle) after outputting the computation value 62, and feeds the last computation value 64 back to an input of the computing module 52, and the computing module 52 generates a computation value 62 of next cycle based on the set value 61 and the last computation value 64.

The mechanical brake sensing module 53 may be a physical module, used to periodically sense an activated status of a mechanical brake (not shown) of the electric vehicle during an operation period of the electric vehicle. When the mechanical brake is activated, it means that the vehicle driver actively performs a braking action. On the other hands, if the mechanical brake is inactivated, it means that the vehicle driver does not have the intention to brake.

In one embodiment, the mechanical brake sensing module 53 is a mechanical sensor having a direct contact with the mechanical brake of the electric vehicle (for example, a brake switch arranged under a brake pedal), or an electrical sensor without a direct contact with the mechanical brake of the electric vehicle (for example, a light sensor that uses a light blocking signal to determine the depth of the brake pedal). However, the above descriptions are only few embodiments of the present disclosure, but not limited thereto.

The speed-command generating unit of the present disclosure is mainly incorporated with an electric vehicle that receives power from a battery, and a part of the electric vehicles may provide a motor recovery brake assist function. This kind of technology is also known as an energy recovery brake function, a kinetic energy recovery system (KERS) function or a regenerative braking function. The different names mentioned above are respectively used and provided by different manufacturers, and the function uses the kinetic energy generated by braking a motor to regenerate an electricity correspondingly, the detailed description is omitted here for brevity. In one embodiment, the braking approach selecting module 54 is a software module or a physical module (such as a visual interface on the electric vehicle), and the braking approach selecting module 54 may be operated by the vehicle driver to activate the motor recovery brake assist function for the electric vehicle.

In particular, the braking approach selecting module 54 generates and provides a braking approach selecting signal correspondingly after the vehicle driver selects a braking approach for the electric vehicle. For example, the braking approach selecting module 54 may output a signal of "1" when the motor recovery brake assist function is activated to indicate that the recovery brake is required, and may output a signal of "0" when the motor recovery brake assist function is inactivated to indicate that the recovery brake is not required. If the mechanical brake is detected to be activated during the operation of the electric vehicle, the switching module 55 may switch the braking approach of the electric vehicle based on the braking approach selecting signal provided by the braking approach selecting module 54, and the braking approach is, for example, to enable the motor recovery brake assist function or disable the motor recovery brake assist function.

The switching module 55 may be a software module, and connected with the computing module 52, the mechanical brake sensing module 53 and the braking approach selecting module 54. The switching module 55 decides whether to switch or trim an output value 63 of the speed-command in accordance with the activated status of the mechanical brake of the electric vehicle. Therefore, the vehicle driver is prevented from losing the ability in controlling the electric vehicle when the vehicle driver activates or releases the mechanical brake while the electric vehicle is moving.

As shown in FIG. 3, the switching module 55 receives the computation value 62 of the speed-command from the computing module 52, receives a activated status 65 of the mechanical brake from the mechanical brake sensing module 53, receives the braking approach selecting signal from the braking approach selecting module 54, and receives a motor rotating speed 66 of a motor detected at the very time (such as the first motor 24 and/or the second motor 34 as shown in FIG. 2).

In a first embodiment, if the mechanical brake is inactivated (i.e., the activated status 65 shows that the mechanical brake is inactivated) and a trimming flag is set as a first content at the time of sampling (i.e., during this detecting cycle), the switching module 55 determines that the vehicle driver does not use the mechanical brake. In the meantime, the switching module 55 directly uses the computation value 62 provided by the computing module 52 as a foundation to generate the output value 63 of the speed-command. In other words, the switching module 55 may directly use this cycle's computation value 62 as the output value 63, and output the output value 63 to the motor in order to control the motor. In this embodiment, the switching module 55 does not process the output value 63 of the speed-command. In the embodiment, the first content may be, for example, "disable" or a parameter "0", for being read easily by software.

In a second embodiment, if the mechanical brake is inactivated and the trimming flag is set as a second content (which is different from the first content) at the time of sampling, the switching module 55 determines that the activated status of the mechanical brake is changed. In the meantime, the switching module 55 uses the motor rotating speed 66 of the motor detected at the very time as a foundation to trim the speed-command to generate the output value 63 of the speed-command. In other words, the switching module 55 may directly use the motor rotating speed 66 of the motor detected at the very time as the output value 63, and output the output value 63 to the motor in order to control the motor. In the embodiment, the second content may be, for example, "enable" or a parameter "1".

In this embodiment, the switching module 55 makes the motor rotating speed 66 and the output value 63 of the speed-command to be consistent, so as to avoid the discomfort caused by the inconsistent of the speed-command and a real motor rotating speed 66.

In a third embodiment, if the mechanical brake is activated at the time of sampling, the switching module 55 switches the braking approach according to the braking approach selecting signal (i.e., to enable the motor recovery brake assist function or disable the motor recovery brake assist function). Then, the switching module 55 uses the braking approach selecting signal as a foundation to generate the output value 63 of the speed-command. In particular, if the motor recovery brake assist function is enable, the electric vehicle may obtain a braking force in addition to the mechanical brake, wherein the braking force is generated based on a reverse torque generated from the motor when the motor is controlled to decelerate. If the motor recovery brake assist function is disable, the electric vehicle may only decelerate by the mechanical brake when the mechanical brake is operated by the vehicle driver. Because the total braking force generated when the motor recovery brake assist function is enabled is different from the total braking force generated when the motor recovery brake assist function is disabled, the switching module 55 needs to process the output value 63 of the speed-command additionally to keep the driving smoothly and stably.

In the embodiment, if the mechanical brake is activated and the braking approach selecting signal indicates that the motor recovery brake assist function is disabled at the time of sampling, the switching module 55 uses the motor rotating speed 66 of the motor detected at the very time as a foundation to generate the output value 63 of the speed-command. In other words, the switching module 55 may use the motor rotating speed 66 of the motor detected at the very time as the output value 63, and outputs the output value 63 to the motor in order to control the motor. In the meantime, the speed-command and the actual motor rotating speed 66 are adjusted to be identical, so the driver of the electric vehicle does not outputs a torque. In this scenario, the motor does not output a force, the electric vehicle is decelerated only by the mechanical brake operated by the vehicle driver. Therefore, the control for the electric vehicle to decelerate may be performed easily, and the mechanical brake can be prevented from over consumption (i.e., the braking force of the mechanical brake is unnecessary to resist an additional-generated motor torque).

If the mechanical brake is activated and the braking approach selecting signal indicates that the motor recovery brake assist function is enabled at the time of sampling, the switching module 55 uses a zero-speed command as a foundation to generate the output value 63 of the speed-command. In other words, the switching module 55 may directly uses the zero-speed command as the output value 63, and output the output value 63 to the motor in order to control the motor. In the meantime, the speed-command is zero, so the driver of the electric vehicle may compute and output a larger reverse torque to the motor for deceleration. In this scenario, the electric vehicle may implement the deceleration in accordance with the reverse torque generated from both the motor reverse brake and the braking force from the mechanical brake. Therefore, the control for the electric vehicle to decelerate may be performed easily, and the mechanical brake can be prevented from over consumption (i.e., the braking force of the mechanical brake may be reduced according to the assistance of the reverse torque from the motor).

The trimming module 56 is used to mark or record the activated status 65 of the mechanical brake of last detecting cycle, and determine whether to trim the output value 63 of the speed-command or not in this cycle before outputting the output value 63. As shown in FIG. 3, a trimming process of the present disclosure is to determine whether to input the last computation value 64 to the computing module 52 for the switching module 55 to generate the output value 63 based on a normal computation value 62 (i.e., without trimming the output value 63), or to input the motor rotating speed 66 detected at the very time to the computing module 52 for the switching module 55 to generate the output value 63 based on the motor rotating speed 66 (i.e., to trim the original output value 63 into an output value 63 that is consistent with the motor rotating speed 66).

The trimming module 56 is connected with the mechanical brake sensing module 53 and the computing module 52, and the trimming module 56 may receive the activated status 65 of the mechanical brake from the mechanical brake sensing module 53. In one embodiment, if the mechanical brake is inactivated at the time of last sampling, the trimming module 56 sets the trimming flag as a first content (a flag "0" is illustrated in FIG. 3), and the trimming flag with the first content indicates that the trimming process is disable. In another embodiment, if the mechanical brake is activated at the time of last sampling, the trimming module 56 sets the trimming flag as a second content (a flag "1" is illustrated in FIG. 3), and the trimming flag with the second content indicates that the trimming process is enabled.

In the above embodiment, if the switching module 55 determines that the mechanical brake is inactivated at the time of sampling and the trimming flag is set as the first content, it means that the mechanical brake is inactivated at last detecting cycle, and is still inactivated at this detecting cycle (i.e., while detecting at the very time), which means that the vehicle driver does not have the intention to decelerate the electric vehicle. If the switching module 55 determines that the mechanical brake is inactivated at the time of sampling but the trimming flag is set as the second content, it means that the mechanical brake is activated at last detecting cycle but is released at this detecting cycle (i.e., the activated status 65 of the mechanical brake is changed), which means that the vehicle driver is satisfied by the speed of the electric vehicle at the very time or even wants to accelerate (by releasing the mechanical brake). By taking the activated status of the mechanical brake into consideration and setting the trimming flag, the speed-command generating unit of the present disclosure may determine whether the vehicle driver has the intention to decelerate, to maintain the speed of the electric vehicle or to accelerate the electric vehicle.

After considering all data of the electric vehicle including the computation value of last cycle (i.e., the last computation value 64), the activated status of the mechanical brake of this cycle, the activated status 65 of the mechanical brake of last cycle (i.e., the trimming flag), the motor rotating speed 66 of the motor detected at the very time, the braking approach selecting signal, etc., the switching module 55 may determine a decision about how to adjust the output value 63, and then output the adjusted output value 63 to the motor in order to control the motor.

As shown in FIG. 3, the speed-command generating unit of the present disclosure may include a waiting module 57, the waiting module 57 may be a software module connected with the computing module 52.

In particular, the electric vehicle continuously detects a torque and a torque current of the motor through an internal sensor (not shown), and determines whether the torque and the torque current are saturated. In other words, the electric vehicle determines whether the output of the driver of the electric vehicle hits an upper limit. If the output of the driver hits the upper limit (i.e., at least one of the torque and the torque current is saturated), it means that even if the vehicle driver keeps operating the throttle unit of the electric vehicle for acceleration, the motor of the electric vehicle cannot generate additional power. In the meantime, the speed-command generating unit of the present disclosure blocks the speed-command (such as blocking the set value 61 of the speed-command) through the waiting module 57. For example, the speed-command generating unit may ignore the throttle operating signal temporarily until the torque or the torque current is no longer saturated.

In one embodiment, the waiting module 57 sets a waiting flag as a third content when the torque and the torque current of the motor are not saturated, wherein the third content indicates that it is unnecessary to keep the speed-command waiting and may normally use the set value 61 of the speed-command for computation. In the embodiment, the third content may be, for example, "non-waiting" or a parameter "0", for being read easily by software. Besides, the waiting module 57 sets the waiting flag as a fourth content when one of the torque and the torque current of the motor is saturated, wherein the fourth content indicates that the speed-command needs to be waiting, and the set value 61 of the speed-command may not be used temporarily before the content of the waiting flag is changed. In the embodiment, the fourth content may be, for example, "waiting" or a parameter "1", for being read easily by software.

It should be mentioned that in the above embodiment, when the mechanical brake is inactivated at the time of sampling, the trimming flag is set as the first content (i.e., the mechanical brake is inactivated at the time of last sampling), and the waiting flag is set as the third content (i.e., the torque and the torque current of the motor are not saturated), the computing module 52 provides the computation value 62 correspondingly based on the set value 61 of the speed-command without trimming the speed-command and keeping the speed-command to wait.

In other hands, when the mechanical brake is inactivated at the time of sampling, the trimming flag is set as the first content, and the waiting flag is set as the fourth content (i.e., the torque or the torque current of the motor is saturated), the computing module 52 determines whether the set value 61 is smaller then the computation value 62, i.e., the computing module 52 determines whether the vehicle driver intents to decelerate by releasing the throttle unit of the electric vehicle but not yet activate the mechanical brake. In this embodiment, the computing module 52 may pre-provide a corresponding computation value 62 in accordance with the motor rotating speed 66 of the motor detected at the very time when the set value 61 is determined to be smaller than the computation value 62 (corresponding to a signal path shown in FIG. 3 that the trimming flag is set as "1"), so as to stable the driving and reduce the vibration of the electric vehicle. When the set value 61 is determined to be greater than or equal to the computation value 62, the computing module 52 ignores the computation value 62 computed at the very time (i.e., the computing module 52 determines that at least one of the torque and the torque current of the motor is saturated and the vehicle driver intents to accelerate, so the computing module 52 keeps the speed-command waiting), and directly uses the computation value of last cycle (i.e., the last computation value 64) as the computation value 62 of this cycle (corresponding to a signal path shown in FIG. 3 that the trimming flag is set as "0").

After the computation value 62 is decided, the driver of the electric vehicle uses the computation value 62 provided by the computing module 52 as a foundation to generate the output value 63 of the speed-command correspondingly by the switching module 55.

In the present disclosure, the waiting module 57 is used to resolve a problem of motor torque saturation or motor torque current saturation. The trimming module 56 is used to resolve a problem that the speed-command at the very time may different from the actual motor rotating speed when the vehicle driver releases the throttle unit for deceleration while the speed-command is kept waiting or releases the mechanical brake for acceleration. The switching module 55 is used to modify the speed-command under different circumstances that the motor recovery brake assist function is enabled or disabled when the mechanical brake is activated by the vehicle driver.

By using the aforementioned modules, the speed-command generating unit of the present disclosure may switch or trim the output value 63 of the speed-command under a scenario that the mechanical brake is activated by the vehicle driver and the motor recovery brake assist function is enabled, so as to make the speed-command and the actual motor rotating speed 66 to be consistent, and prevents the electric vehicle from losing the braking force temporarily. Also, the speed-command generating unit may keep the speed-command waiting to make the speed-command and the actual motor rotating speed 66 to be consistent under a scenario that the vehicle driver heavily presses the throttle unit for acceleration or release the throttle unit for deceleration, so as to prevent the vehicle driver from temporarily losing the ability in controlling the electric vehicle. Furthermore, the speed-command generating unit may process the speed-command quickly by trimming the speed-command or keeping the speed-command to wait under a scenario that the vehicle driver makes the electric vehicle overloaded or rides the electric vehicle to climbing, so as to prevent the vehicle driver from temporarily losing the ability in controlling the electric vehicle.

Figure 4:
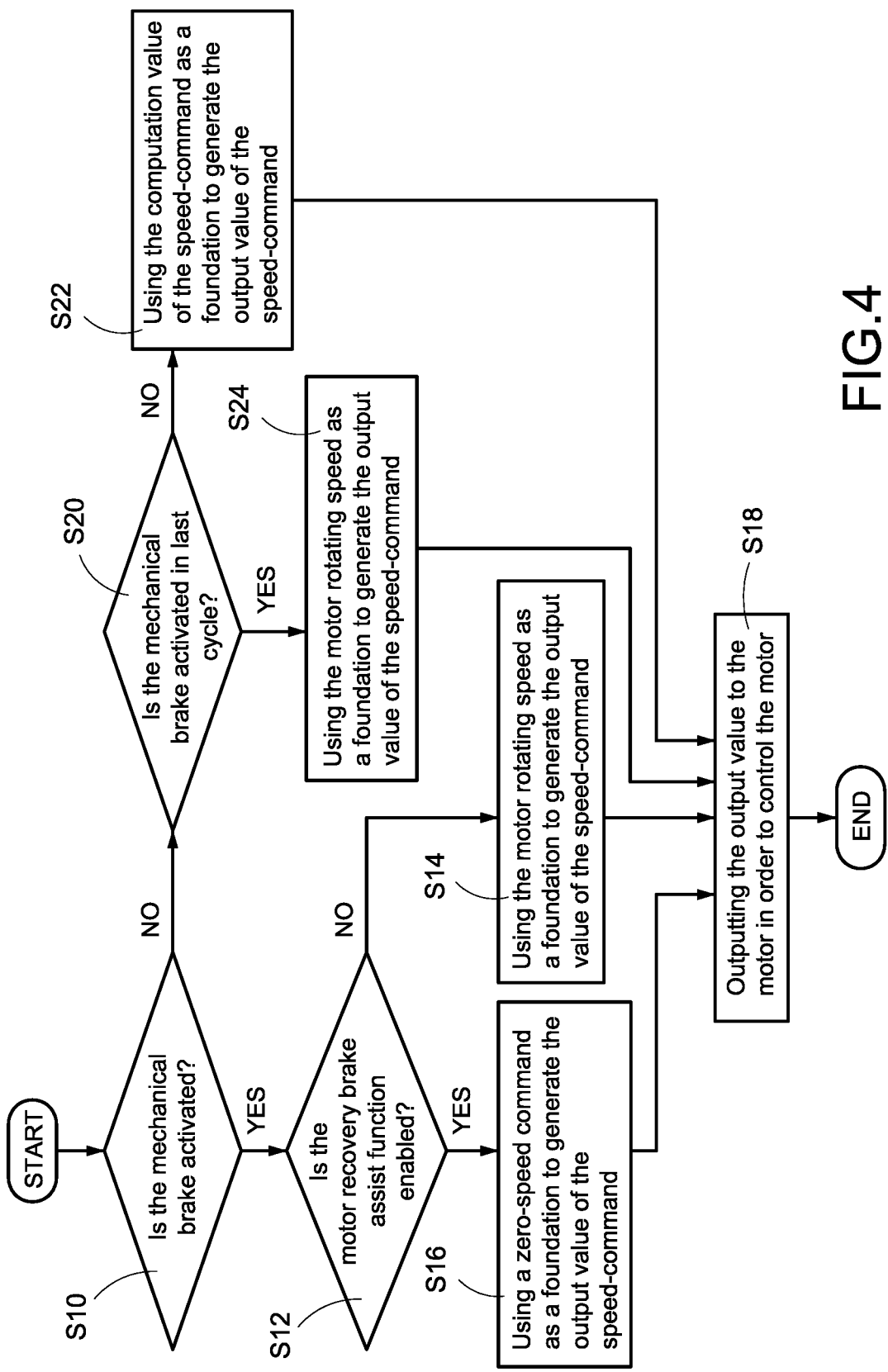
FIG. 4 is a flowchart of a speed-command generating method of a first embodiment according to the present disclosure.

Please refers to FIG. 3 and FIG. 4 at the same time, wherein FIG. 4 is a flowchart of a speed-command generating method of a first embodiment according to the present disclosure. The present disclosure further discloses a speed-command generating method of an electric vehicle (referred to as the generating method hereinafter), the generating method may be implemented by the speed-command generating unit as shown in FIG. 3, and is incorporated with a driver of an electric vehicle to control a motor in the electric vehicle.

It should be mentioned that FIG. 4 discloses a computation logic of a computer-readable code. In the present disclosure, a period of time needed by the speed-command generating unit to perform the computation logic shown in FIG. 4 for one time from a starting node to an ending node, is named as a cycle (or a detecting cycle). During the operation of the electric vehicle, the speed-command generating unit may continuously perform detecting in accordance with the computation logic shown in FIG. 4.

As shown in FIG. 4, the driver of the electric vehicle (which is incorporated with the speed-command generating unit of the present disclosure) continuously detects the activated status 65 of the mechanical brake during the operation of the electric vehicle, and determines whether the mechanical brake is activated by the vehicle driver in this detecting cycle in accordance with the activated status 65 (step S10). When the mechanical brake is determined to be activated in this cycle, the driver further determines whether the motor recovery brake assist function of the electric vehicle is enabled (step S12), and the driver sets the content of a switching flag correspondingly.

In one embodiment, the driver may set the switching flag as a fifth content or a six content, wherein the fifth content indicates that the motor recovery brake assist function is disabled, and the six content indicates that the motor recovery brake assist function is enabled. The fifth content may be, for example, "non-recovering" or a parameter "0", for being read easily by software. The six content may be, for example, "recovering" or a parameter "1", for being read easily by software. It should be mentioned that, after the mechanical brake is determined to be activated and the switching flag is set, the driver may control the electric vehicle to brake correspondingly based on the content of the switching flag, such as to brake with the motor recovery brake assist function or without the motor recovery brake assist function.

However, the above description is only one embodiment of the present disclosure, but not limited thereto.

If the motor recovery brake assist function is determined to be disabled in same detecting cycle (i.e., the switching flag is set as the fifth content), the driver uses the motor rotating speed 66 of the motor of the electric vehicle detected at the very time as a foundation to generate the output value 63 of the speed-command (step S14). If the motor recovery brake assist function is determined to be enabled (i.e., the switching flag is set as the six content), the driver uses a zero-speed command as a foundation to generate the output value 63 of the speed-command (step S16). After the step S14 or the step S16, the driver may, by using the switching module 55 but not limited, decide a final output value 63 and outputs the final output value 63 to the motor in order to control the motor (step S18).

It should be mentioned that, the driver may use the zero-speed command as the output value 63 of the speed-command in the step S16. Therefore, a torque command generated by the driver based on the output value 63 may be too large and is likely to cause a problem to the electric vehicle. For example, the braking of the electric vehicle may be too rush, and causes a high instant recovery power to the battery that the battery may not withstand. In order to solve the above problem, it is required to restrict the torque command computed and provided by the driver.

Figure 5:
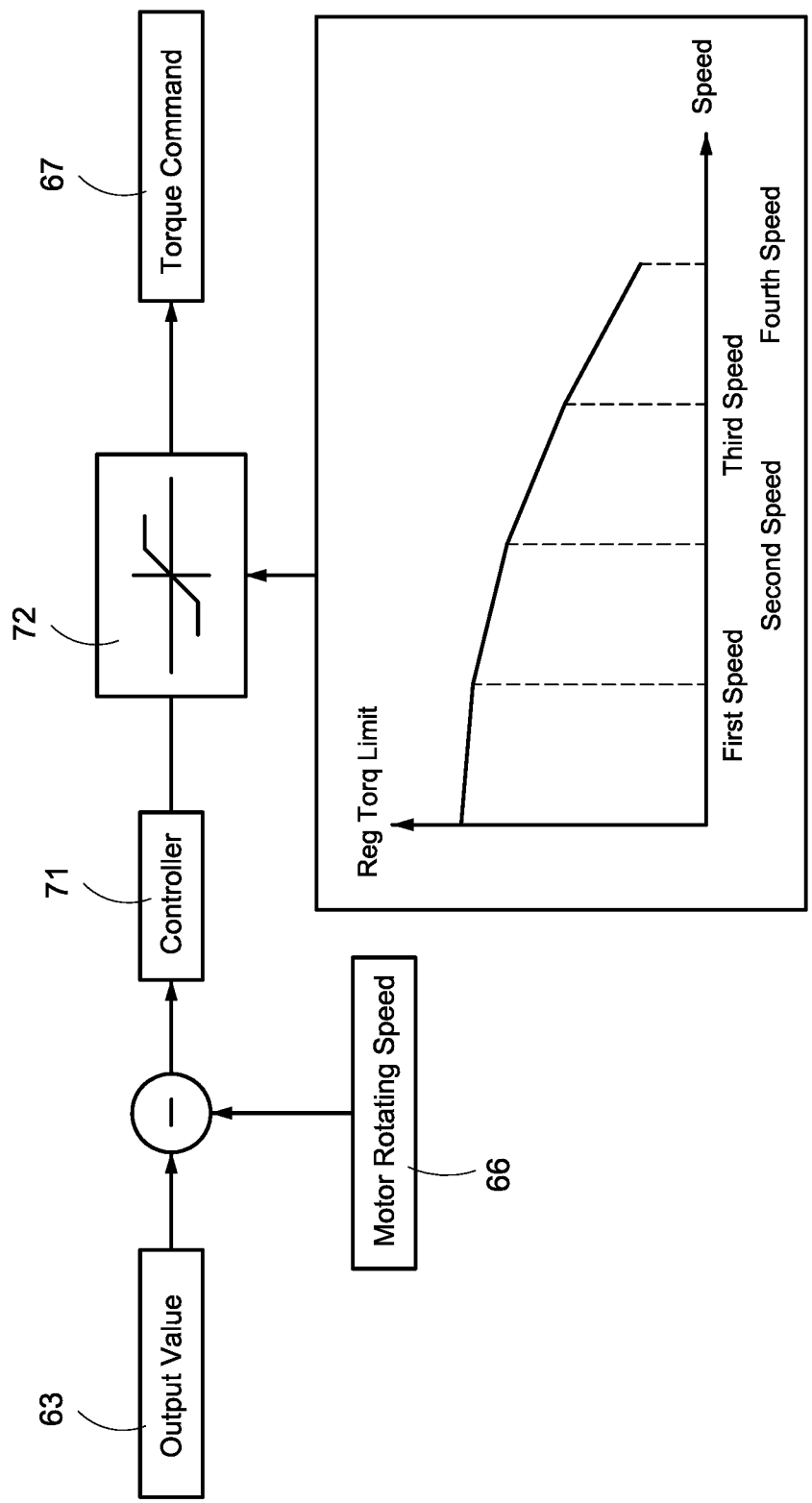
FIG. 5 is a schematic diagram showing an upper limit of a torque command of a first embodiment according to the present disclosure.

FIG. 5 is a schematic diagram showing an upper limit of a torque command of a first embodiment according to the present disclosure. In the embodiment shown in FIG. 5, the driver of the electric vehicle further includes a controller 71 and a torque restriction table 72, wherein the torque restriction table 72 records a torque upper limit of the motor at different speeds. In particular, the torque upper limit indicates a maximum torque of the motor preset when the motor is manufactured which may be withstood by the motor without damaging the motor.

In one embodiment, the controller 71 may be a proportional-integral-derivative (PID) controller, or a PID controller without a derivative function (also known as a PI controller), but not limited. In the embodiment, the controller 71 computes a torque command 67 of the motor in accordance with the output value 63 of the speed-command, the motor rotating speed 66 detected at the very time and the torque upper limit of the motor, and then controls the motor to rotate forwardly or reversely based on the torque command 67. It should be mentioned that the torque command 67 in the embodiment is restricted to be smaller than or equal to the torque upper limit recorded in the torque restriction table 72, which may keep the battery safe. For example, a large torque may be generated if the motor is controlled to enter a power generating mode while the motor rotates reversely, and the large torque may cause a huge current to flow back to the battery and damages the battery.

In particular, the controller 71 computes and outputs a difference value of the output value 63 of the speed-command and the motor rotating speed 66 detected at the very time, and computes the torque command 67 used to control motor based on the difference value. The approach used by the controller 71 to compute the torque command 67 is omitted here for brevity.

In the present disclosure, the controller 71 inquires the torque restriction table 72 based on the motor rotating speed 66 of the motor detected at the very time, so as to obtain a torque upper limit correspondingly. In one embodiment, the electric vehicle may be arranged with a throttle sensor (not shown), such as a brake switch or a light blocking sensor, so as to detect a pressing depth of the throttle unit. However, the above description is only one embodiment of the present disclosure, but not limited thereto.

Next, the controller 71 compares the computed torque command 67 and the obtained torque upper limited, and determines whether the torque command 67 exceeds the torque upper limit according to the comparing result. If the torque command 67 is smaller than or equal to the torque upper limit, the controller 71 directly outputs the torque command 67 to the motor. If the torque command 67 is greater than the torque upper limit, the controller 71 updates the torque command 67 by the torque upper limit, and outputs the updated torque command 67 to the motor in order to control the motor.

By way of the aforementioned technical solution, even if the motor recovery brake assist function is enabled, the problem discussed above that a large torque may be generated and causes a large braking force and then a huge current that the battery cannot withstand is generated and flows back to the battery and damages the battery, can be prevented.

Please refers back to FIG. 4. If the driver of the electric vehicle determines, in the step S10, that the mechanical brake is inactivated in this detecting cycle, the driver may determine whether the mechanical brake is activated at the time of last sampling (i.e., in last detecting cycle) (step S20), and set a trimming flag correspondingly. As disclosed above, the driver sets the trimming flag as the first content (such as "disable" or a parameter "0") when the mechanical brake is determined to be inactivated in last cycle, and sets the trimming flag as the second content (such as "enable" or a parameter "1") when the mechanical brake is determined to be activated in last cycle.

In the embodiment, if the mechanical brake is inactivated in last cycle (i.e., the trimming flag is set as the first content), the driver uses the computation value 62 of the speed-command outputted from the computing module 52 as a foundation to generate the output value 63 of the speed-command (step S22). On the other hands, if the mechanical brake is activated in last cycle (i.e., the trimming flag is set as the second content), the driver trims the speed-command by using the motor rotating speed 66 of the motor detected at the very time as a foundation to generate the output value 63 of the speed-command (step S24).

In particular, if the step S22 of FIG. 4 is executed, it means that the mechanical brake is inactivated either in last cycle and in this cycle, in other words, the activated status of the mechanical brake remains unchanged for a period of time. In this scenario, the driver may directly use the computation value 62 outputted from the computing module 52 as a foundation to generate the output value 63, and it is unnecessary for the driver to process or trim the speed-command, so the computation procedure may be speeded up. If the step S24 of FIG. 4 is executed, it means that the mechanical brake is activated in last cycle but is released by the vehicle driver in this cycle, in other words, the activated status of the mechanical brake is changed, the vehicle driver may want to keep the speed or to accelerate of the electric vehicle. In this scenario, the driver trims the output value 63 of the speed-command as the motor rotating speed 66, so as to avoid the discomfort caused by the inconsistent of the speed-command and the actual motor rotating speed 66.

After the step S22 or the step S24, the driver may decide a final output value 63 of the speed-command through the switching module 55, and output the final output value 63 to the motor in order to control the motor (step S18).

In particular, as disclosed in FIG. 3, the speed-command generating unit used by the driver of the present disclosure may include a waiting module 57. In a case that the mechanical brake is inactivated either in last cycle and in this cycle, the driver may further determine about how to process the speed-command in accordance with a waiting flag set by the waiting module 57.

Figure 6:
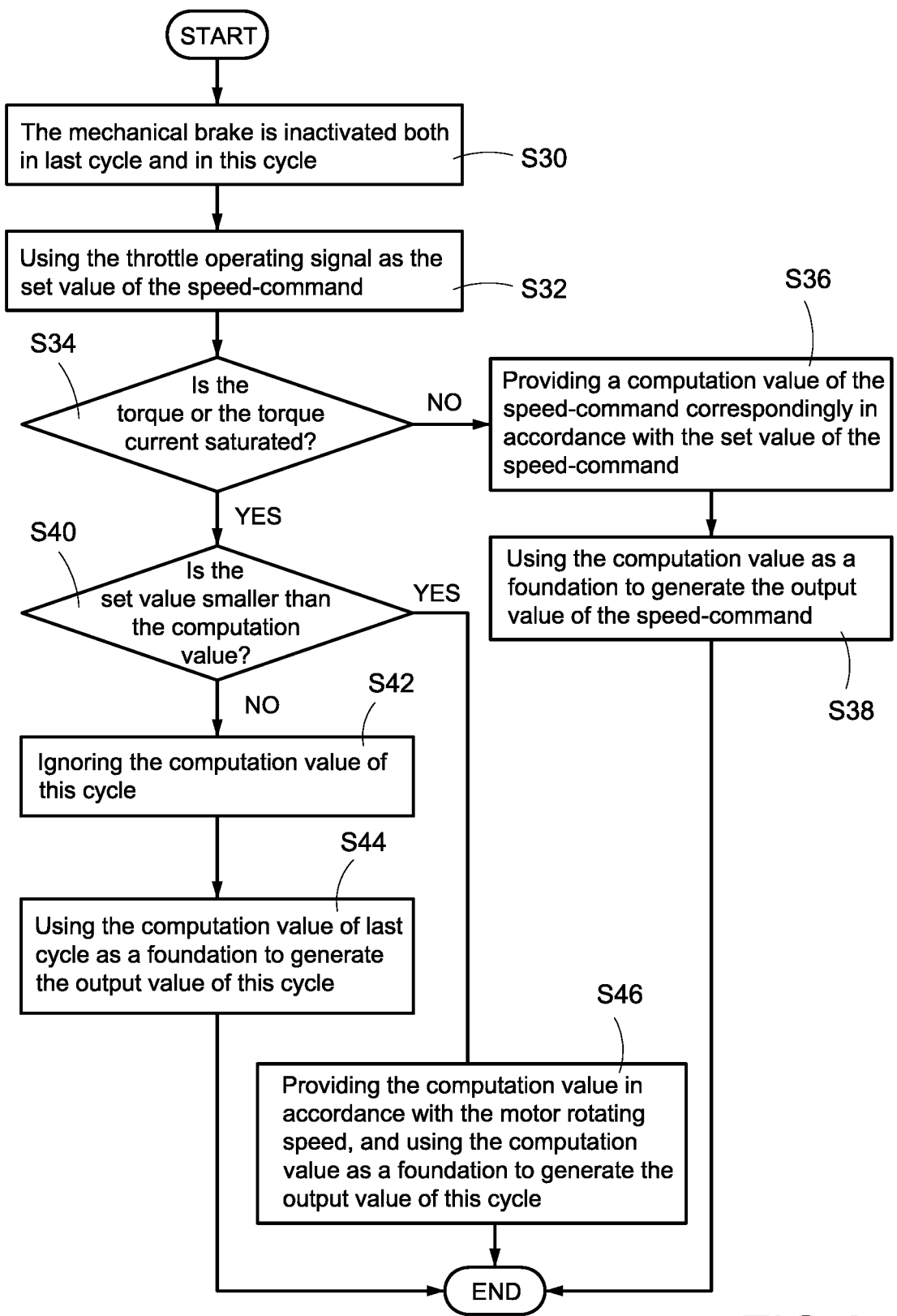
FIG. 6 is a flowchart of a speed-command generating method of a second embodiment according to the present disclosure.

FIG. 6 is a flowchart of a speed-command generating method of a second embodiment according to the present disclosure. In the embodiment, the driver determines that the mechanical brake is inactivated both in last cycle and in this cycle (step S30), then, the driver uses the throttle operating signal sent from the throttle module 51 as the set value 61 of the speed-command (step S32). Next, the driver determines whether the torque or the torque current of the motor is saturated (step S34).

If the torque and the torque current are determined to be unsaturated in the step S34, the driver sets the waiting flag as the third content (for example, the third content may be "non-waiting" or a parameter "0", for being read easily by software), so as to indicate that it is no need for the speed-command to wait in this cycle. In the meantime, the driver provides a computation value 62 of the speed-command correspondingly in accordance with the set value 61 of the speed-command (step S36), and uses the computation value 62 as a foundation to generate the output value 63 of the speed-command to control the motor (step S38). In other words, in the step S36 and the step S38, the driver does not process or trim the speed-command, instead, the driver directly compute the output value 63 of the speed-command in accordance with the throttle operating signal and the last computation value 64 (i.e., the computation value 62 of the speed-command of last cycle) according to a regular procedure, i.e., the driver bypasses the trimming process of the speed-command.

If the torque or the torque current of the motor is determined to be saturated in the step S34, the driver sets the waiting flag as the fourth content (for example, the fourth content may be "waiting" or a parameter "1", for being read easily by software), so as to indicate that the speed-command needs to wait in this cycle. In the meantime, the driver determines whether the set value 61 is smaller than the computation value 62 provided by the computing module 52 (step S40), i.e., the driver determines whether the vehicle driver of the electric vehicle has the intention to decelerate by releasing the throttle unit.

If the set value 61 is determined to be greater than or equal to the computation value 62 in the step S40, it means that the vehicle driver does not have the intention to decelerate, or the vehicle driver even intents to accelerate. In this scenario, the driver ignores the computation value 62 of this cycle (step S42), and directly uses the computation value of last cycle (i.e., the last computation value 64) as a foundation to generate the output value 63 of the speed-command of this cycle to control the motor (step S44). In other words, the driver in this scenario bypasses the trimming process of the speed-command.

On the other hand, if the set value 61 is determined to be smaller than the computation value 62 in the step S40, it means that the vehicle driver intents to decelerate by releasing the throttle unit. In this scenario, the driver provides the computation value 62 in accordance with the motor rotating speed 66 of the motor detected at the very time, i.e., the computing module 52 uses the motor rotating speed 66 to replace the last computation value 64 and inputs the motor rotating speed 66 to the computing module 52. In this case, the driver uses the computation value 62 computed above as a foundation to generate the output value 63 of the speed-command of this cycle to control the motor (step S46).

As disclosed above, the speed-command generating unit and speed-command generating method of the present disclosure may take the activated status of the mechanical brake in last cycle and in this cycle, the braking approach selected by the vehicle driver, the motor torque upper limit, the condition of the torque and the torque current, etc. into consideration, so as to decide whether to switch or trim the speed-command. Therefore, the problem that the vehicle driver may temporarily lose the ability in controlling the electric vehicle when the output torque of the electric vehicle is saturated or when the mechanical brake is pressed by the vehicle driver, can be effectively prevented.

Please refers to FIG. 7(*a*), FIG. 7(*b*), FIG. 8(*a*), FIG. 8(*b*), FIG. 9(*a*) and FIG. 9(*b*) FIG. 7(*a*) and FIG. 7(*b*) disclose a scenario that the mechanical brake is activated by the vehicle driver, FIG. 8(*a*) and FIG. 8(*b*) disclose a scenario that the throttle unit of the electric vehicle is heavily pressed by the vehicle driver to accelerate and then released by the vehicle driver to decelerate, FIG. 9(*a*) and FIG. 9(*b*) disclose a scenario that the electric vehicle is driven by the vehicle driver to be overloaded or to climbing.

Figure 7A:
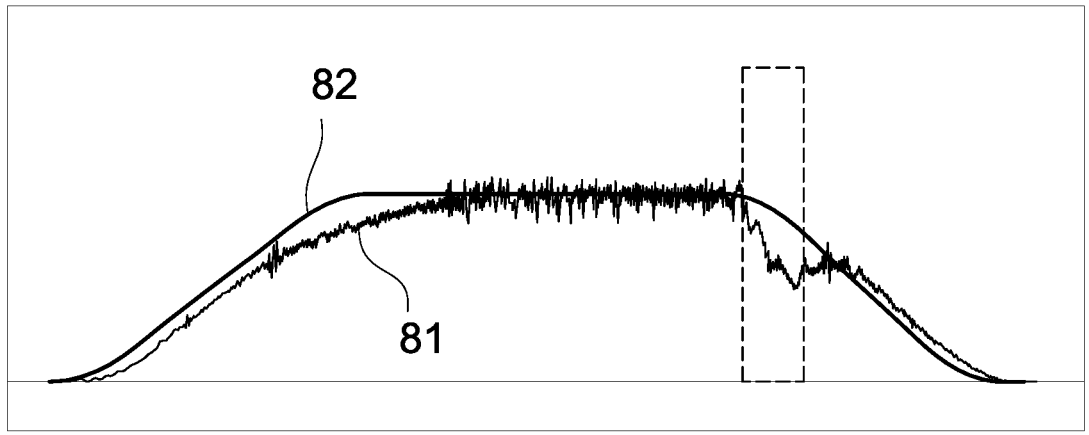
FIG. 7(a) is a first schematic diagram showing a variation of speed-command with respect to related art.

FIG. 7(*a*) discloses an example with respect to related art. In FIG. 7(*a*), the horizontal axis is used to indicate time. When the electric vehicle starts to accelerate, the motor rotating speed 81 slightly lags a speed-command 82 along the vertical direction as shown on the left part of FIG. 7(a). When the mechanical brake is pressed to provide a braking force, the motor rotating speed 81 declines rapidly (as the dotted box shown on the right part of FIG. 7(a)), but the speed-command 82 is not modified due to the activation of the mechanical brake. Therefore, an unstable feeling may be felt by the vehicle driver. In the scenario, the speed-command 82 is greater than the actual motor rotating speed 81, so the controller still computes a forward torque command. The motor generates an accelerating torque to against the mechanical brake after the motor receives the forward torque command. Therefore, the braking efficiency of the electric vehicle is reduced because of the motor. In a case, the electric vehicle may even lose its braking force in a short period of time. Under this circumstance, the vehicle driver may have an unusual riding feeling and an unexpected moving behavior.

Figure 7B:
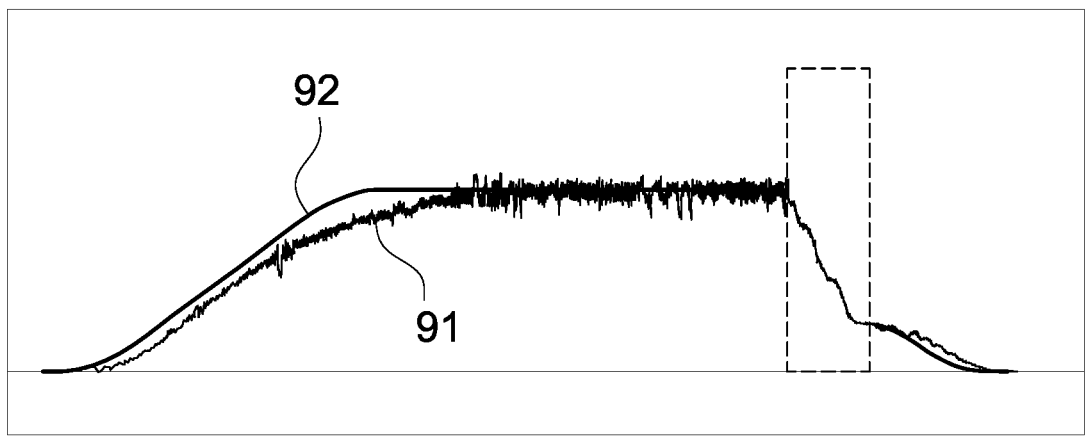
FIG. 7(b) is a schematic diagram showing an optimized speed-command of a first embodiment according to the present disclosure.

FIG. 7(b) discloses an example with respect to the present disclosure. As shown in FIG. 7(b), when the mechanical brake is activated (as the dotted box shown on the right part of FIG. 7(b)), not only a motor rotating speed 91 reduces, a speed-command 92 is also modified immediately (such as discussed in step S14 of FIG. 4 that the value of the speed-command is set as the motor rotating speed detected at the very time). In this scenario, the speed-command 92 is modified to be consistent with the motor rotating speed 91, the controller does not compute the aforementioned torque command, so the motor does not generate the accelerating torque to against the mechanical brake. It can be seen from FIG. 7(b) that, by using the technical solution provided by the present disclosure, the vehicle driver may not have an unusual riding feeling when the mechanical brake is activated, and may not feel an unexpected moving behavior.

Figure 8A:
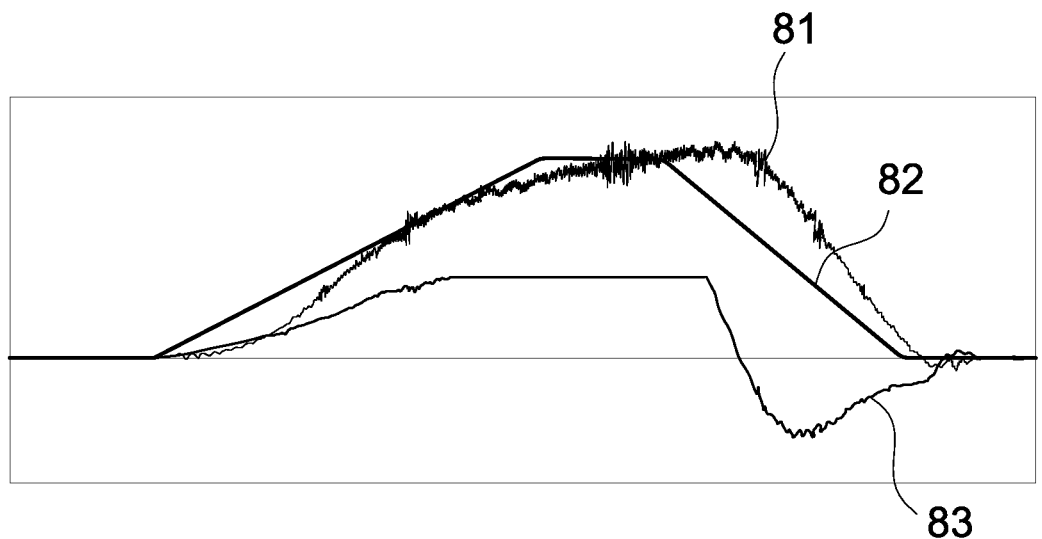
FIG. 8(a) is a second schematic diagram showing a variation of speed-command with respect to related art.

FIG. 8(a) discloses an example with respect to related art. When the vehicle driver heavily presses the throttle unit to accelerate the electric vehicle, a torque 83 of the motor (indicated as a curve line in FIG. 8(a)) may be saturated. As shown in FIG. 8(a), if the torque 83 of the motor is saturated, the torque 83 tends to remain the same instead of increasing continuously when the throttle unit is pressed heavily and continuously. In this scenario, the motor rotating speed 81 cannot effectively track the speed-command 82. In the related art, the driver of the electric vehicle fails to process the speed-command 82 appropriately. In particular, the electric vehicle may not decelerate immediately at the time the vehicle driver releases the throttle unit. Instead, the electric vehicle only starts to decelerate after the speed-command 82 reduces to a level that is lower than the motor rotating speed 81. Under this circumstance, the vehicle driver may lose the ability in controlling the electric vehicle temporarily.

Figure 8B:
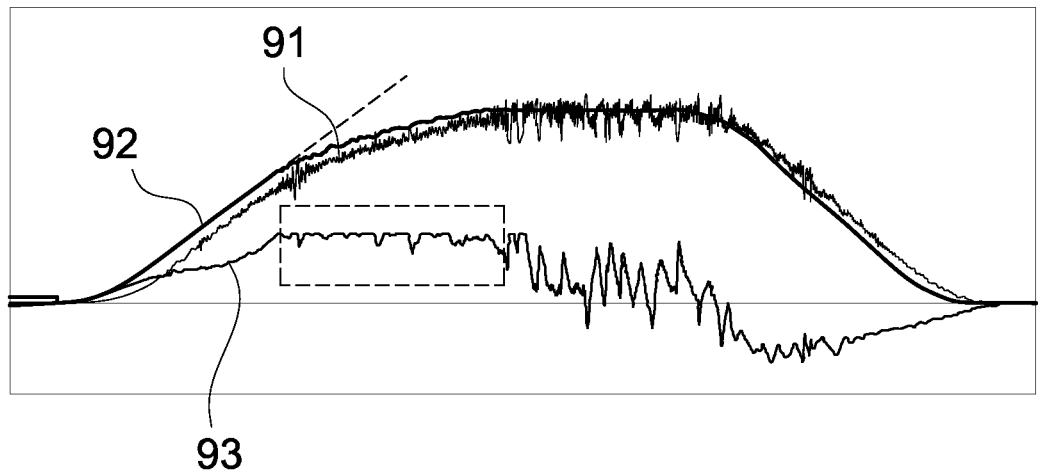
FIG. 8(b) is a schematic diagram showing an optimized speed-command of a second embodiment according to the present disclosure.

FIG. 8(b) discloses an example with respect to the present disclosure. As shown in FIG. 8(b), when a torque 93 of the motor is saturated (as the dotted box shown in FIG. 8(b)), the driver of the electric vehicle makes a speed-command 92 to wait (such as discussed in step S42 and S44 of FIG. 6 that ignores the speed-command at the very time and uses a last computation value as a foundation to compute). In this scenario, the acceleration of the speed-command 92 is smaller than a preset value because of waiting, so the speed-command 92 and the motor rotating speed 91 may be consistent with each other (such as discussed in step S46 of FIG. 6 that the motor rotating speed detected at the very time is used as the computation value of the speed-command).

Besides, according to the indication of dotted line shown on the left part of FIG. 8(b), when the vehicle driver continuously operates the throttle unit to accelerate but the torque 93 is already saturated (as the dotted box shown on the left part of FIG. 8(b)), the computed speed-command 92 may not climb along the dotted line predicted. In this scenario, the driver of the electric vehicle continuously modifies the curve line of the speed-command 92 because the torque 93 is saturated, so as to make the speed-command 92 to be consistent with the motor rotating speed 91. Therefore, when the vehicle driver releases the throttle unit, the electric vehicle may immediately decelerate according to the throttle operating signal as shown on the right part of FIG. 8(b)). It can be seen from FIG. 8(b) that, by using the technical solution provided by the present disclosure, the vehicle driver may not lose the ability in controlling the electric vehicle temporarily due to torque saturation.

Figure 9A:
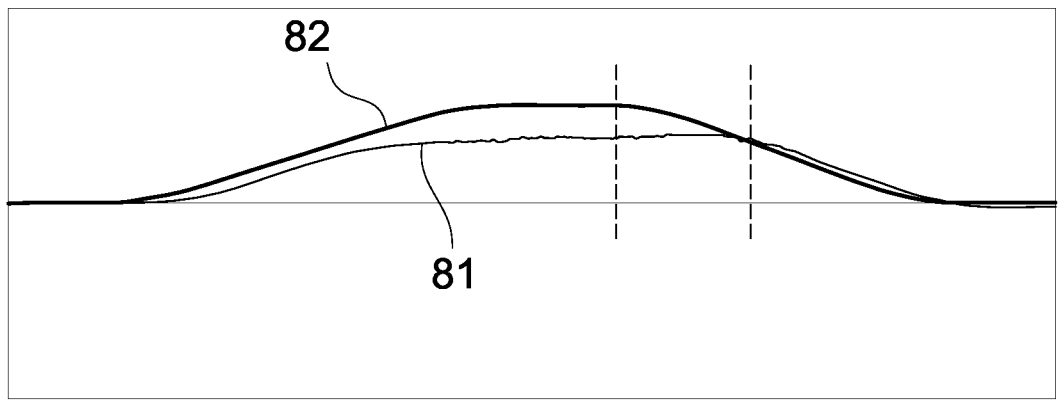
FIG. 9(a) is a third schematic diagram showing a variation of speed-command with respect to related art.

FIG. 9(a) discloses an example with respect to related art. When the vehicle driver makes the electric vehicle overloaded or rides the electric vehicle to climbing and causes a torque of the motor to be saturated, the motor rotating speed 81 cannot effectively track the speed-command 82. As shown on the right part of FIG. 9(a), because the driver of related art fails to process the speed-command 82 appropriately, after the vehicle driver releases the throttle unit (as the illustration that a curve line of the speed-command 82 starts to decline from a smooth area), the electric vehicle may not decelerate immediately (as the illustration that a curve line of the motor rotating speed 81 does not decline immediately following the speed-command 82). Instead, the electric vehicle starts to decelerate only after the speed-command 82 declines to a level that is lower than the motor rotating speed 81. Under this circumstance, the vehicle driver may lose the ability in controlling the electric vehicle temporarily.

Figure 9B:
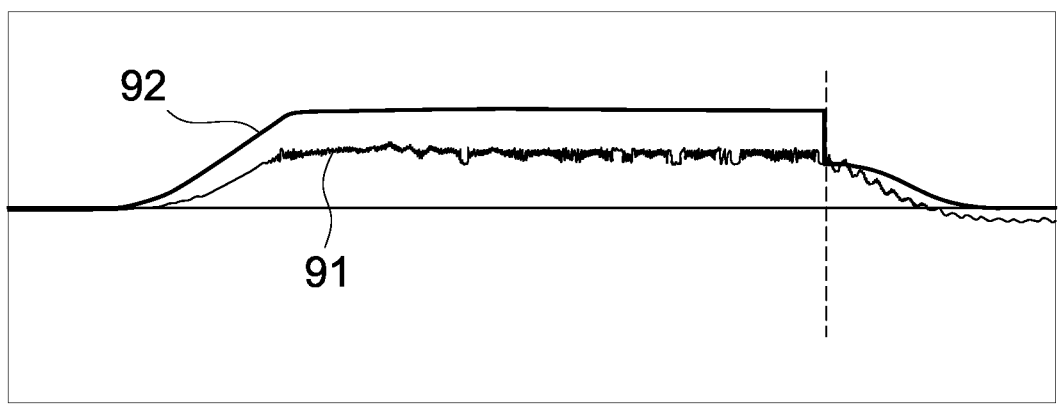
FIG. 9(b) is a schematic diagram showing an optimized speed-command of a third embodiment according to the present disclosure.

FIG. 9(b) discloses an example with respect to the present disclosure. As shown in FIG. 9(b), the driver in the present disclosure makes the speed-command 92 to wait when the torque of the motor is saturated, and the driver trims the speed-command 92 when the vehicle driver releases the throttle unit, so the electric vehicle may decelerate immediately based on the throttle operating signal (as discussed in the step S46 of FIG. 6 that the driver uses the motor rotating speed detected at the very time as the computation value of the speed-command). It can be seen from the right part of FIG. 9(b) that, by using the technical solution provided by the present disclosure, the motor speed detected at the very time is used to compute the speed-command without waiting for a period of time at the moment that the vehicle driver releases the throttle unit, so the vehicle driver may not lose the ability in controlling the electric vehicle temporarily due to torque saturation.

As the skilled person will appreciate, various changes and modifications can be made to the described embodiment. It is intended to include all such variations, modifications and equivalents which fall within the scope of the present disclosure, as defined in the accompanying claims.

What is claimed is:

1. A speed-command generating unit of an electric vehicle, incorporated with a driver of the electric vehicle, the driver being used to drive a motor of the electric vehicle, and the speed-command generating unit comprising:
   a throttle module, computing a set value of a speed-command in accordance with a throttle operating signal generated based on an external operation;
   a computing module, computing a computation value of the speed-command based on the set value;
   a mechanical brake sensing module, continuously sensing an activated status of a mechanical brake of the electric vehicle;

a braking approach selecting module;

a trimming module, connected with the mechanical brake sensing module and the computing module, configured to set a trimming flag as disable if the mechanical brake is inactivated at a time of last sampling, and set the trimming flag as enable if the mechanical brake is activated at a time of last sampling; and a switching module, connected with the computing module, the mechanical brake sensing module, the braking approach selecting module and the trimming module, using the computation value as a foundation to generate an output value of the speed-command to control the motor if the mechanical brake is detected to be inactivated by the mechanical brake sensing module at a sampling of a current cycle and the trimming flag is disable, using a motor rotating speed of the motor detected at the very time as a foundation to generate the output value of the speed-command to control the motor if the mechanical brake is detected to be inactivated by the mechanical brake sensing module at the sampling of the current cycle and the trimming flag is enable, and switching a braking approach based on a braking approach selecting signal provided by the braking approach selecting module and using the braking approach selecting signal as a foundation to generate the output value of the speed-command to control the motor if the mechanical brake is detected to be activated by the mechanical brake sensing module at the sampling of the current cycle.

2. The speed-command generating unit in claim 1, wherein the braking approach selecting module is configured to provide the braking approach selecting signal to indicate whether a motor recovery brake assist function is enabled, and the switching module is configured to use the motor rotating speed as a foundation to generate the output value if the mechanical brake is activated at the sampling of the current cycle and the braking approach selecting signal indicates that the motor recovery braking assist function is disabled, and the switching module is configured to use a zero-speed command as a foundation to generate the output value if the mechanical brake is activated at the sampling of the current cycle and the braking approach selecting signal indicates that the motor recovery braking assist function is enabled.

3. The speed-command generating unit in claim 2, further comprising:

a torque restriction table, recording a torque upper limit of the motor at different speeds; and a controller, used to compute a torque command of the motor in accordance with the output value, the motor rotating speed and the torque upper limit, wherein the torque command is equal to or smaller than the torque upper limit.

4. The speed-command generating unit in claim 1, further comprising a waiting module connected with the computing module, used to set a waiting flag as non-waiting if a torque and a torque current of the motor are not saturated, wherein the computing module is configured to provide the computation value in accordance with the set value if the mechanical brake is inactivated at the sampling of the current cycle, the trimming flag is disable and the waiting flag is non-waiting, and the switching module is configured to use the computation value as a foundation to generate the output value.

5. The speed-command generating unit in claim 4, wherein the computing module is configured to set the waiting flag as waiting if the torque or the torque current is saturated, and determine whether the set value is smaller than the computation value if the mechanical brake is inactivated at the sampling of the current cycle, the trimming flag is set as disable and the waiting flag is set as waiting, and the computing module is configured to ignore the computation value and use the computation value of a last cycle as the computation value of this cycle when the set value is greater than or equal to the computation value, and to provide the computation value of this cycle in accordance with the motor rotating speed when the set value is smaller than the computation value.

6. A speed-command generating method of an electric vehicle, incorporated with a driver of the electric vehicle, the driver being used to drive a motor of the electric vehicle and comprising a speed-command generating unit, the speed-command generating unit being used to compute a set value of a speed-command in accordance with a throttle signal and generate a computation value of the speed-command based on the set value, the speed-command generating method comprising:

a) continuously detecting an activated status of a mechanical brake of the electric vehicle;

b) setting a trimming flag in accordance with the activated status of last sampling, wherein the trimming flag is used to indicate that the mechanical brake is inactivated at a time of last sampling when being set as disable, and indicate that the mechanical brake is activated at a time of last sampling when being set as enable;

c) using the computation value of the speed-command at a sampling of a current cycle as a foundation to generate an output value of the speed-command when the mechanical brake is determined to be inactivated at the sampling of the current cycle in the step a) and the trimming flag is set as disable in the step b);

d) using a motor rotating speed of the motor as a foundation to generate the output value of the speed-command when the mechanical brake is determined to be inactivated at the sampling of the current cycle in the step a) and the trimming flag is set as enable in the step b);

e) outputting the output value to the motor to drive the motor after the step c) or the step d); and f) when the mechanical brake is determined to be activated at the sampling of the current cycle in the step a), switching a braking approach based on a braking approach selecting signal and using the braking approach selecting signal as a foundation to generate the output value of the speed-command to drive the motor.

7. The speed-command generating method in claim 6, wherein the step f) comprises:

f1) setting a switching flag in accordance with the braking approach selecting signal, wherein the switching flag indicates that a motor recovery brake assist function is disabled when being set as non-recovering, and indicates that the motor recovery brake assist function is enabled when being set as recovering;

f2) using the motor rotating speed as a foundation to generate the output value of the speed-command if the switching flag is set as non-recovering;

f3) using a zero-speed command as a foundation to generate the output value of the speed-command if the switching flag is set as recovering; and f4) outputting the output value to the motor to drive the motor after the step f2) or the step f3).

8. The speed-command generating method in claim 6, further comprising a step g) after the step e) or the step f):

computing a torque command of the motor in accordance with the output value, the motor rotating speed and a torque upper limit, wherein the torque command is smaller than or equal to the torque upper limit.

9. The speed-command generating method in claim 6, wherein the step c) comprises:
   c1) determining whether a torque of the motor is saturated;
   c2) determining whether a torque current of the motor is saturated; and
   c3) providing the computation value based on the set value and using the computation value as a foundation to generate the output value if the torque and the torque current are not saturated.

10. The speed-command generating method in claim 9, further comprising following steps after the step c3):
   c4) determining whether the set value is smaller than the computation value when the torque or the torque current is saturated;
   c5) ignoring the computation value if the set value is determined to be greater than or equal to the computation value, and using the computation value of a last cycle as a foundation to generate the output value; and
   c6) providing the computation value in accordance with the motor rotating speed if the set value is determined to be smaller than the computation value, and using the computation value as a foundation to generate the output value.

* * * * *